(12) United States Patent
Hozono

(10) Patent No.: US 11,856,151 B2
(45) Date of Patent: Dec. 26, 2023

(54) IMAGE READING DEVICE CAPABLE OF RELATIVELY POSITIONING DOCUMENT CONVEYANCE DEVICE AND SCANNER HOUSING USING ENGAGED PORTION AND ENGAGING PORTION, AND IMAGE FORMING APPARATUS EQUIPPED WITH IMAGE READING DEVICE

(71) Applicant: KYOCERA Document Solutions Inc., Osaka (JP)

(72) Inventor: Tomohide Hozono, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 329 days.

(21) Appl. No.: 17/501,607

(22) Filed: Oct. 14, 2021

(65) Prior Publication Data
US 2022/0131994 A1    Apr. 28, 2022

(30) Foreign Application Priority Data
Oct. 23, 2020  (JP) .................................. 2020-177863

(51) Int. Cl.
*H04N 1/04* (2006.01)
*H04N 1/12* (2006.01)
*H04N 1/10* (2006.01)

(52) U.S. Cl.
CPC ........... *H04N 1/121* (2013.01); *H04N 1/1061* (2013.01)

(58) Field of Classification Search
None
See application file for complete search history.

(56) References Cited

U.S. PATENT DOCUMENTS

2014/0118805 A1* 5/2014 Katayama .............. H04N 1/121
358/498

FOREIGN PATENT DOCUMENTS

JP          H11227974 A    8/1999

* cited by examiner

*Primary Examiner* — Cheukfan Lee
(74) *Attorney, Agent, or Firm* — IP BUSINESS SOLUTIONS, LLC

(57) ABSTRACT

An image reading device includes a scanner housing, a pair of hinge mechanisms, and a document conveyance device. The scanner housing includes an engaged portion for positioning provided at a portion of a top surface of the scanner housing located outside of an original glass plate mounted in the top surface of the scanner housing. The document conveyance device includes an engaging portion for positioning engageable with the engaged portion when in the closed position, and is positioned in a plane along a top surface of the original glass plate by engagement of the engaging portion with the engaged portion. In positioning the document conveyance device, the document conveyance device is fixed to the pair of hinge mechanisms to allow the document conveyance device to be adjusted in position in the plane.

5 Claims, 11 Drawing Sheets

LEFT SIDE ← → RIGHT SIDE

IMAGE READING DEVICE CAPABLE OF RELATIVELY POSITIONING DOCUMENT CONVEYANCE DEVICE AND SCANNER HOUSING USING ENGAGED PORTION AND ENGAGING PORTION, AND IMAGE FORMING APPARATUS EQUIPPED WITH IMAGE READING DEVICE

INCORPORATION BY REFERENCE

This application claims priority to Japanese Patent Application No. 2020-177863 filed on 23 Oct. 2020, the entire contents of which are incorporated by reference herein.

BACKGROUND

The present disclosure relates to image reading devices and image forming apparatuses equipped with image reading devices.

An image reading device equipped with a document conveyance device is known. This image reading device includes a scanner housing in the top surface of which an original glass plate is mounted.

The document conveyance device is mounted through a pair of hinge mechanisms to a rear end portion of the scanner housing. The pair of hinge mechanisms each include a hinge shaft extending in a horizontal direction. The document conveyance device is designed to be openable and closable relative to the top surface of the scanner housing by pivotally moving up and down about the hinge shafts. When in a closed position, the document conveyance device conveys an original document toward an image reading position located on the top surface of the scanner housing. In the interior of the scanner housing just under the image reading position, a reading unit stands ready to optically read an original document. The reading unit reads an image on the original document passing across the image reading position.

The image reading device of this type has a problem that if an original document passing across the image reading position on the original glass plate is conveyed in a skewed orientation relative to a predetermined direction (a subscanning direction orthogonal to a main scanning direction), a document image read by the reading unit is tilted relative to a background image. To cope with this problem, a general image reading device includes a positioning mechanism for adjusting the position of the document conveyance device. This positioning mechanism swings the document conveyance device in the closed position frontward and rearward with one of the hinge mechanisms as a fulcrum, thus enabling adjustment of the position (in-plane tilt along the top surface of the original glass plate) of the document conveyance device.

SUMMARY

A technique improved over the aforementioned technique is proposed as one aspect of the present disclosure.

An image reading device according to an aspect of the present disclosure includes a scanner housing, a pair of hinge mechanisms, and a document conveyance device. The scanner housing includes an original glass plate mounted in a top surface thereof and contains an optically reading device capable of optically reading an image on an original document. The pair of hinge mechanisms are provided at an end of the scanner housing. The document conveyance device is supported pivotally about an axis extending in a horizontal direction by the pair of hinge mechanisms, covers the top surface of the scanner housing to make the top surface of the scanner housing openable and closable, and conveys the original document to an image reading position on a top surface of the original glass plate when in a closed position. The scanner housing includes an engaged portion for positioning provided at a portion of the top surface of the scanner housing located outside of the original glass plate. The document conveyance device includes an engaging portion for positioning engageable with the engaged portion when in the closed position, and is positioned in a plane along the top surface of the original glass plate by engagement of the engaging portion with the engaged portion. In positioning the document conveyance device, the document conveyance device is fixed to the pair of hinge mechanisms to allow the document conveyance device to be adjusted in position in the plane.

An image forming apparatus according to another aspect of the present disclosure includes the above-described image reading device and an image forming device. The image forming device forms, on a recording medium, the image on the original document acquired by reading by the image reading device.

DETAILED DESCRIPTION

Hereinafter, a description will be given of an embodiment of the present disclosure with reference to the drawings. However, the present disclosure is not limited to the following embodiment.

Embodiment

Figure 1:
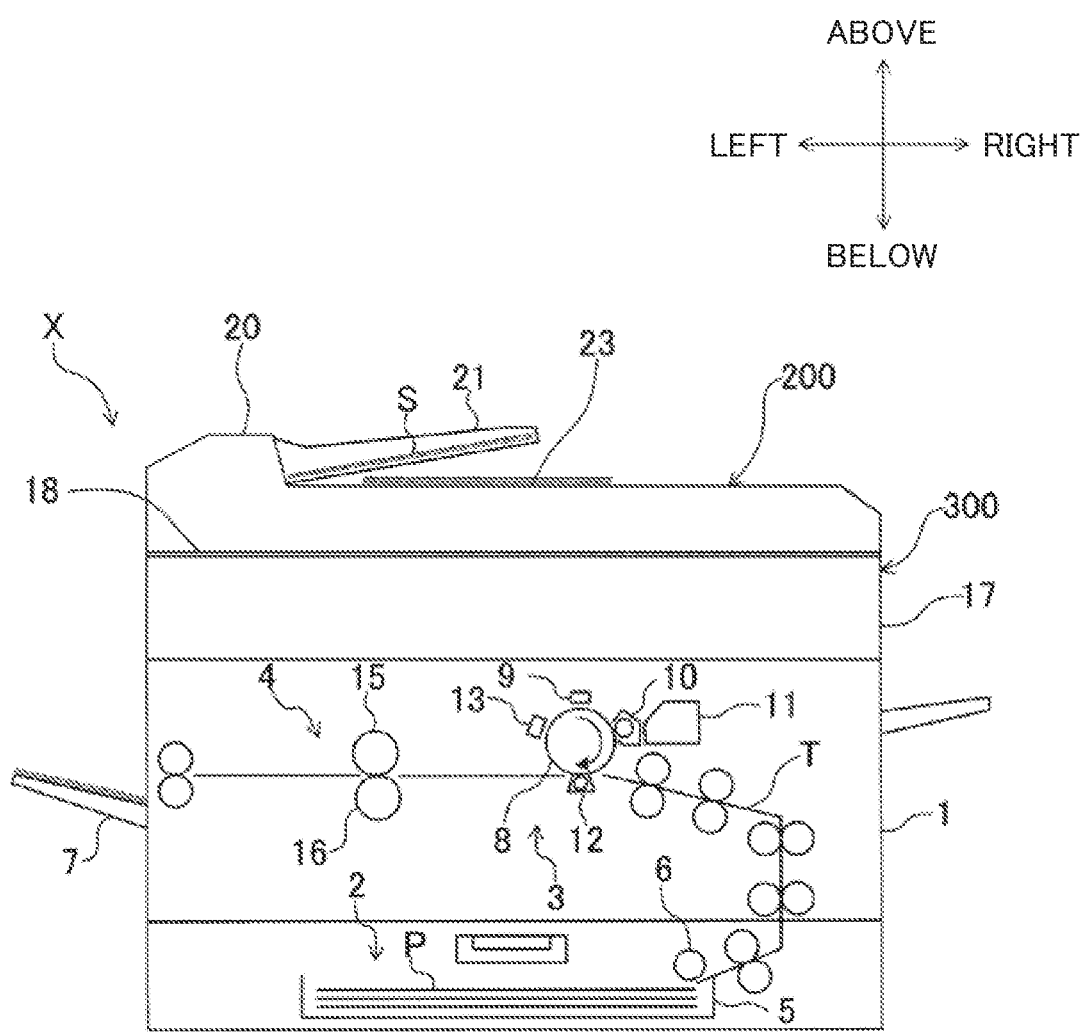
FIG. 1 is a schematic view showing the structure of an image forming apparatus including a document conveyance device according to an embodiment of the present disclosure.
Figure 2:
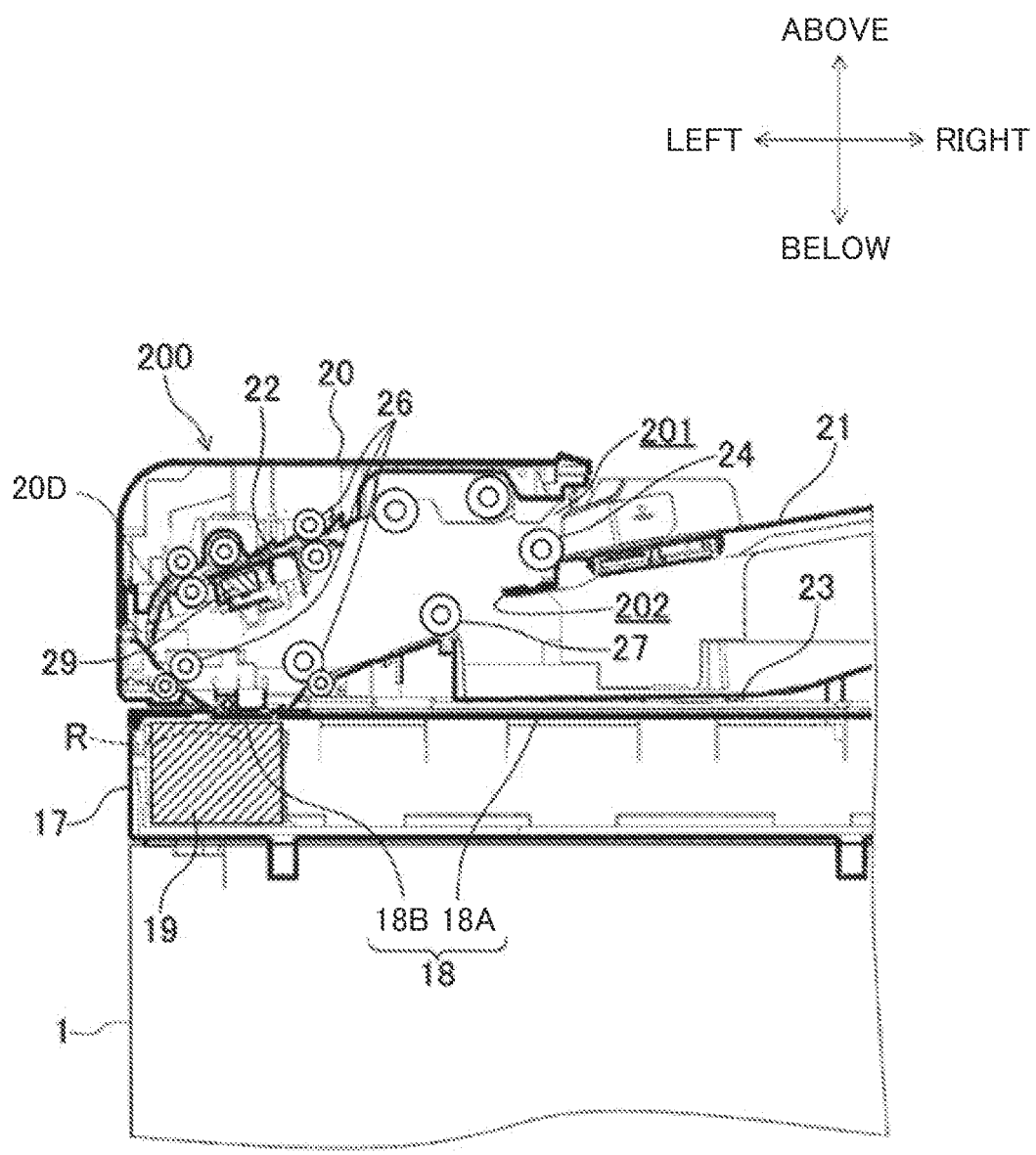
FIG. 2 is a vertical cross-sectional view showing the document conveyance device.

FIG. 1 is a schematic view showing the structure of an image forming apparatus X including a document conveyance device 200 according to an embodiment of the present disclosure. FIG. 2 is a vertical cross-sectional view of the document conveyance device 200. The document conveyance device 200 constitutes part of an image reading device 300. The image forming apparatus X is a copying machine that prints a document image read by the image reading device 300.

The image forming apparatus X includes an image forming apparatus body 1 having a rectangular box shape in appearance. The image reading device 300 is disposed on top of the image forming apparatus body 1.

The image forming apparatus body 1 includes a sheet feed device 2, an image forming device 3, and a fixing device 4. The sheet feed device 2 includes: a sheet feed cassette 5 containing a plurality of sheets P stacked in a bundle; and a pick-up roller 6 capable of picking up the sheets P in the sheet feed cassette 5 sheet by sheet and feeding the sheet P to a predetermined sheet conveyance path T. The sheet conveyance path T extends upward from the sheet feed device 2 and then extends horizontally to a sheet output tray 7.

The image forming device 3 includes a photosensitive drum 8, a charging device 9, a developing device 10, a toner container 11, a transfer roller 12, and a destaticizing device 13. The image forming device 3 forms, on a sheet P fed from the sheet feed device 2, for example, an image on an original document read by the image reading device 200, in the following manner.

Specifically, first, the charging device 9 charges the photosensitive drum 8 with a predetermined potential. Next, a laser scanning unit (LSU) irradiates the surface of the photosensitive drum 8 with light based on image data. Thus, an electrostatic latent image is formed on the surface of the photosensitive drum 8.

The developing device 10 supplies toner to the electrostatic latent image on the photosensitive drum 8 to develop the electrostatic latent image. The transfer roller 12 rotates in a state pressed against the photosensitive drum 8 with the sheet P in between. In doing so, a transfer voltage is applied to the transfer roller 12, so that a toner image on the surface of the photosensitive drum 8 is transferred to the sheet P. The sheet P with the toner transferred thereto is fed to the fixing device 4 to be described hereinafter. The destaticizing device 13 removes an electric charge on the surface of the photosensitive drum 8 from which the toner image has been transferred to the sheet P.

The fixing device 4 includes a fixing roller 15 and a pressure roller 16 pressed against each other. The fixing roller 15 is internally provided with a heater. The fixing device 4 applies heat and pressure to the toner image while clamping and conveying the sheet P between the fixing roller 15 and the pressure roller 16, thus fixing the toner image on the sheet P.

[Structure of Image Reading Device 300]

The image reading device 300 includes: a scanner housing 17 placed on top of the image forming apparatus body 1; and a document conveyance device 200 mounted to the scanner housing 17 to make the top surface of the scanner housing 17 openable and closable relative to the scanner housing 17.

Figure 3:
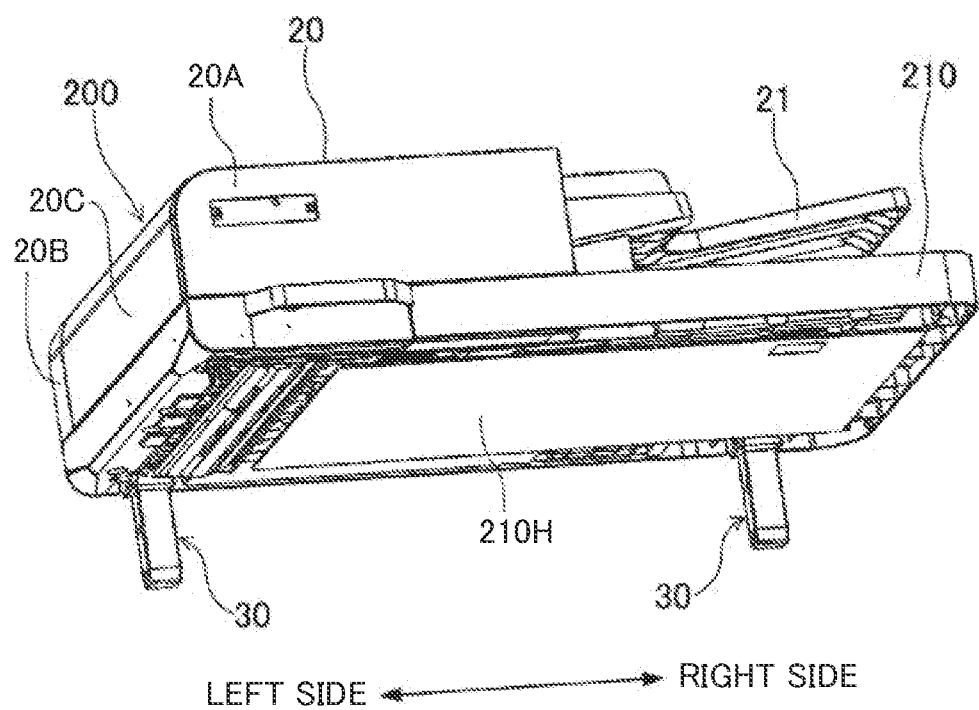
FIG. 3 is a perspective view showing the document conveyance device.
Figure 4:
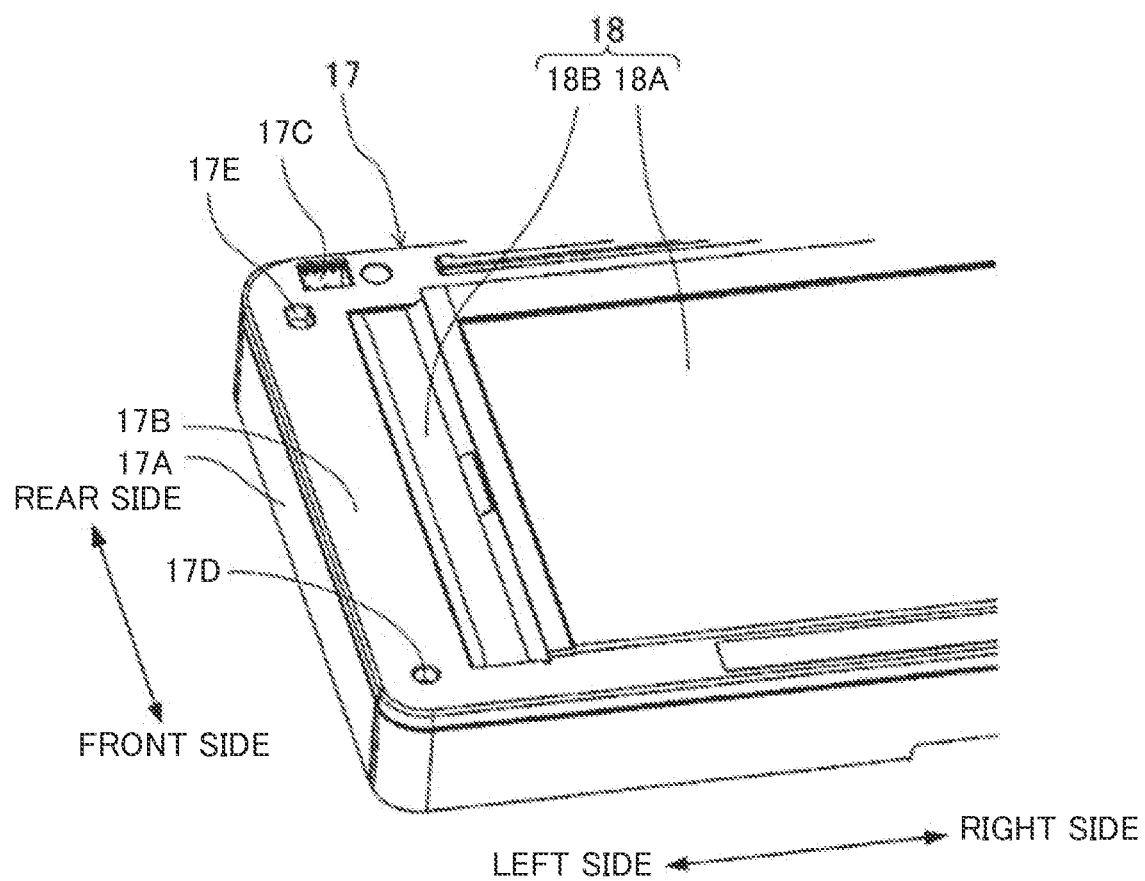
FIG. 4 is an enlarged perspective view showing a left half of a scanner housing.

As shown in FIGS. 2 to 4, the scanner housing 17 is formed of a box-shaped body rectangular in plan view. The scanner housing 17 is positioned relative to the top surface of the image forming apparatus body 1 and, in this state, fixed to the image forming apparatus body 1 by bolting.

As shown in FIG. 4, the scanner housing 17 includes a housing main body 17A and a cover 17B. The housing main body 17A and the cover 17B are molded from a resin material. The housing main body 17A has an open-topped, flat rectangular box shape.

The cover 17B is formed with an original glass plate 18 fitted in a rectangular opening. The original glass plate 18 includes a first original glass plate 18A for use in a stationary reading mode and a second original glass plate 18B for use in a sheet-through reading mode. The first original glass plate 18A is provided in a major portion of the cover 17B except for a left end portion thereof. The second original glass plate 18B is provided in the left end portion of the cover 17B.

In a portion of the scanner housing 17 rearward of the original glass plate 18, a pair of leg insert holes 17C (only one shown in FIG. 4) into which legs 34 of hinge mechanisms 30 described hereinafter are to be fitted are formed. The pair of leg insert holes 17C have the shape of an upwardly-open rectangular sleeve and are spaced apart from each other in a left-to-right direction.

In a portion of the scanner housing 17 leftward of the second original glass plate 18B, a front engagement recess 17D and a rear engagement recess 17E both for use in positioning the document conveyance device 200 are provided. The front engagement recess 17D is an upwardly-open, bottomed, cylindrical recess and is formed in a front left corner of the cover 17B of the scanner housing 17. The rear engagement recess 17E is a bottomed, slotted recess extending in a front-to-rear direction and is formed in a rear left corner of the cover 17B of the scanner housing 17. The front engagement recess 17D and the rear engagement recess 17E correspond to the engaged portions for positioning.

As shown in FIG. 2, the scanner housing 17 contains a reading unit 19 that irradiates an original document sheet S with light and generates image data based on reflected light from the original document sheet S. The reading unit 19 (an example of the optically reading device) is loaded with a contact image sensor that optically reads an image on an obverse side of an original document. Alternatively, it is possible to previously fix an image sensor (for example, CCD (charge coupled device) sensor or the like) on a bottom wall of the scanner housing 17 and allow a reflective mirror loaded in the reading unit 19 to guide reflected light from the document image to the CCD sensor. In this case, a combination of the CCD sensor and the reading unit 19 functions as the optically reading device.

The image reading device 300 reads an image on an original document sheet S in either the stationary reading mode or the sheet-through reading mode. Specifically, in a reading operation based on the stationary reading mode, the image reading device 300 reads the image on the original document sheet S placed on the first original glass plate 18A while allowing the reading unit 19 to scan the original document sheet S back and forth in the left-to-right direction shown in FIG. 2. On the other hand, in a reading operation based on the sheet-through reading mode, the image reading device 300 successively feeds original document sheets S sheet by sheet to an image reading position R on the second original glass plate 18B and reads an image on the original document sheet S passing across the image reading position R with the reading unit 19 held at rest immediately under the image reading position R.

[Structure of Document Conveyance Device 200]

The document conveyance device 200 is mounted through a pair of hinge mechanisms 30 described hereinafter to the scanner housing 17. The document conveyance device 200 pivotally moves up and down about hinge shafts, thus making the top surface of the scanner housing 17 openable and closable. The document conveyance device 200 is used while kept in a closed position in both the stationary reading mode and the sheet-through reading mode. The document conveyance device 200 functions as a document holding cover for holding an original document in the stationary reading mode. When a user opens the document conveyance device 200 upward from the closed position, the original document on the first original glass plate 18A can be replaced with another original document.

As shown in FIG. 2, the document conveyance device 200 includes a document placement tray 21, a document conveyance path 22, and a sheet output tray 23.

The document conveyance path 22 is a U-shaped conveyance path leading from a sheet feed opening 201 formed in an upper end of a casing 20 to a sheet output opening 202 formed in a lower end of the casing 20. The document placement tray 21 is connected to the underside of the sheet feed opening 201 in the casing 20. The sheet output tray 23 is connected to the underside of the sheet output opening 202. The sheet output tray 23 is formed by the top surface of a base member 210 described hereinafter. Original document sheets S discharged through the sheet output opening 202 are laid one over another on the top surface of the sheet output tray 23.

In reading an original document in the sheet-through reading mode, the document conveyance device 200 conveys an original document sheet S placed on the document placement tray 21 along the document conveyance path 22 with a sheet feed roller 24 and a plurality of conveyance rollers 26 and then discharges the original document sheet S to the sheet output tray 23 with a sheet output roller 27. The image reading position R exists halfway down the document conveyance path 22. Immediately under the image reading position R, the reading unit 19 stands by below the second original glass plate 18B. The reading unit 19 reads an image on an obverse side of the original document sheet S. A contact image sensor 29 is provided in the document conveyance path 22 and upstream of the image reading position R in a direction of conveyance of the original document sheet S. The contact image sensor 29 reads an image on a reverse side of the original document sheet S. The term "contact image sensor" is also abbreviated as a "CIS".

[Assembly Structure of Document Conveyance Device 200]

Figure 5:
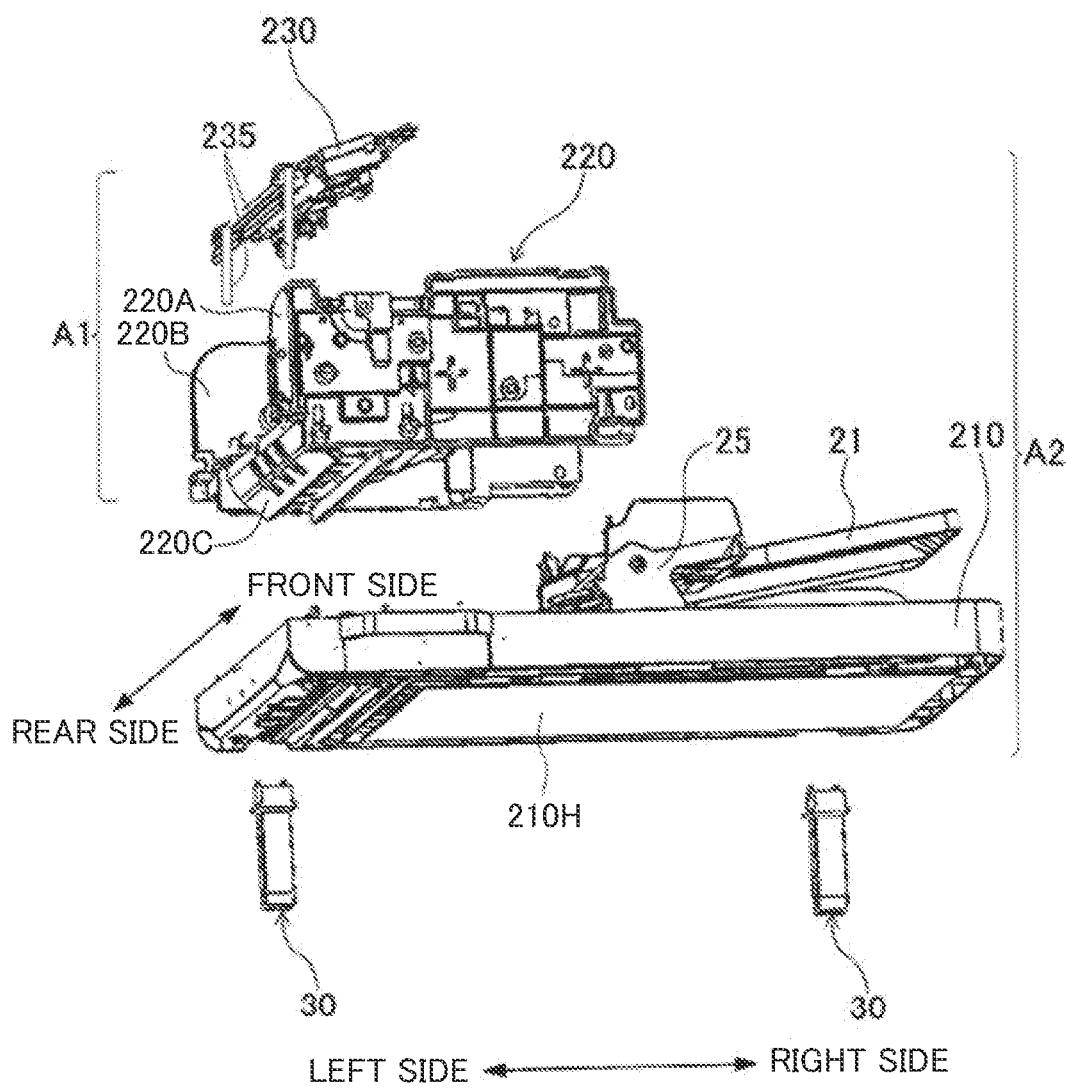
FIG. 5 is an exploded perspective view showing the document conveyance device.

As shown in FIG. 5, the document conveyance device 200 includes a base member 210, a conveyance housing 220, a CIS-mounting frame 230, and a pair of hinge mechanisms 30.

[Details of Hinge Mechanisms 30]

The pair of hinge mechanisms 30 support the document conveyance device 200 to make the document conveyance device 200 openable and closable relative to the scanner housing 17. Specifically, the pair of hinge mechanisms 30 are arranged spaced apart from each other in the left-to-right direction on the rear end of the base member 210 of the document conveyance device 200.

Figure 6:
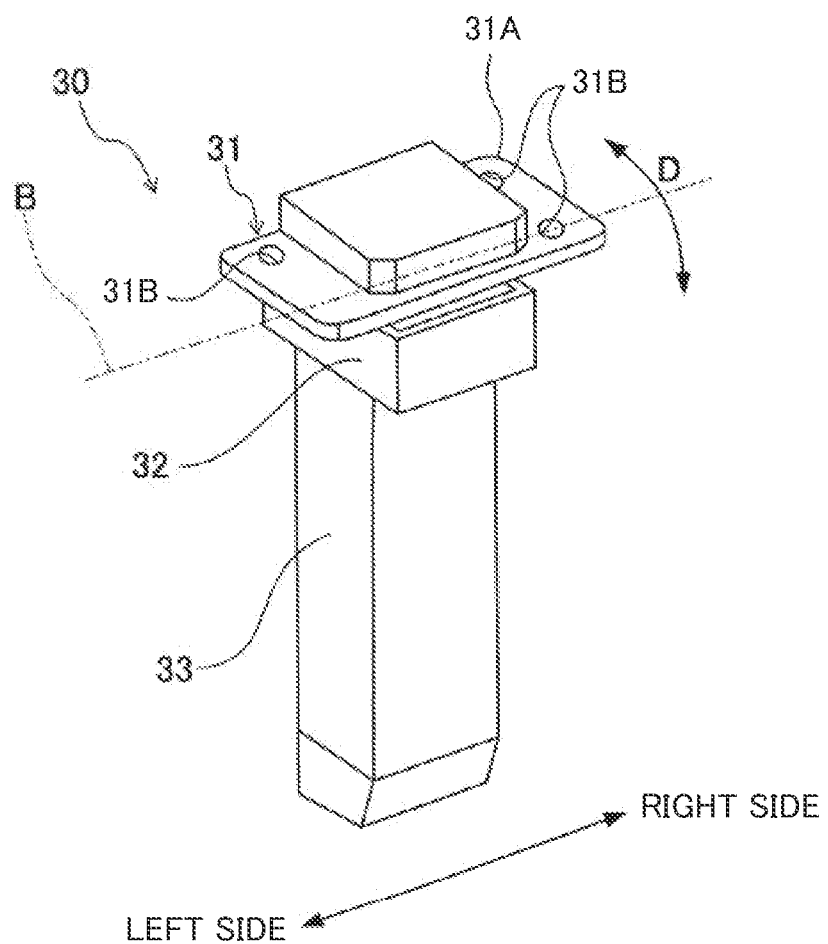
FIG. 6 is a perspective view showing a hinge mechanism.

As shown in FIG. 6, each hinge mechanism 30 includes a pivoting portion 31, a stationary support 32, and a leg 33. The pivoting portion 31 includes: a rectangular plate-like pivot bracket 31A to which the document conveyance device 200 is to be fixed; and a block-shaped projection projecting from the under surface of the pivot bracket 31A. Three mounting holes 31B are formed in the pivot bracket 31A. The pivot bracket 31A can be fixed to the base member 210 of the document conveyance device 200 by screws 211 (see FIG. 7) inserted in the respective mounting holes 31B. The mounting holes 31B have a larger size than the diameter of the shank of the screw 211. The head of the screw 211 is formed in a size having a sufficient engagement allowance even when the shank of the screw 211 is situated at any location within each mounting hole 31B.

A hinge shaft extending in the left-to-right direction penetrates through the projection projecting from the under surface of the pivot bracket 31A. Both ends of the hinge shaft are supported pivotally by the stationary support 32. The dash-double-dot line in the figure represents a pivot axis B coinciding with the axis of the hinge shaft. The pivoting portion 31 is formed pivotally in the direction of the arrow D about the pivot axis B.

The stationary support 32 is formed in the shape of an upwardly-open, bottomed, rectangular sleeve. The hinge shaft is pivotally supported by a pair of walls of the stationary support 32 opposed to each other in the left-to-right direction.

The leg 33 extends vertically downward from the bottom wall of the stationary support 32. The front side of a lower end portion of the leg 33 is inclined in a tapered form so that its front-to-rear dimension gradually decreases downward. The leg 33 can be fitted into the leg insert hole 17C (see FIG. 4) formed in a rear end portion of the scanner housing 17.

[Details of Base Member 210 of Document Conveyance Device 200]

A description will be given of the base member 210 with reference to FIGS. 5, 7, and 8. The base member 210 is formed of a flat, rectangular member long in the left-to-right direction. The document placement tray 21 (see FIG. 5) is integrally formed through a connecting wall 25 with the top surface of the base member 210.

The base member 210 functions, in the stationary reading mode, as a document holding member that holds an original document sheet S from above to immobilize it. The under surface of the base member 210 functions as a document holding surface 210H.

Figure 7:
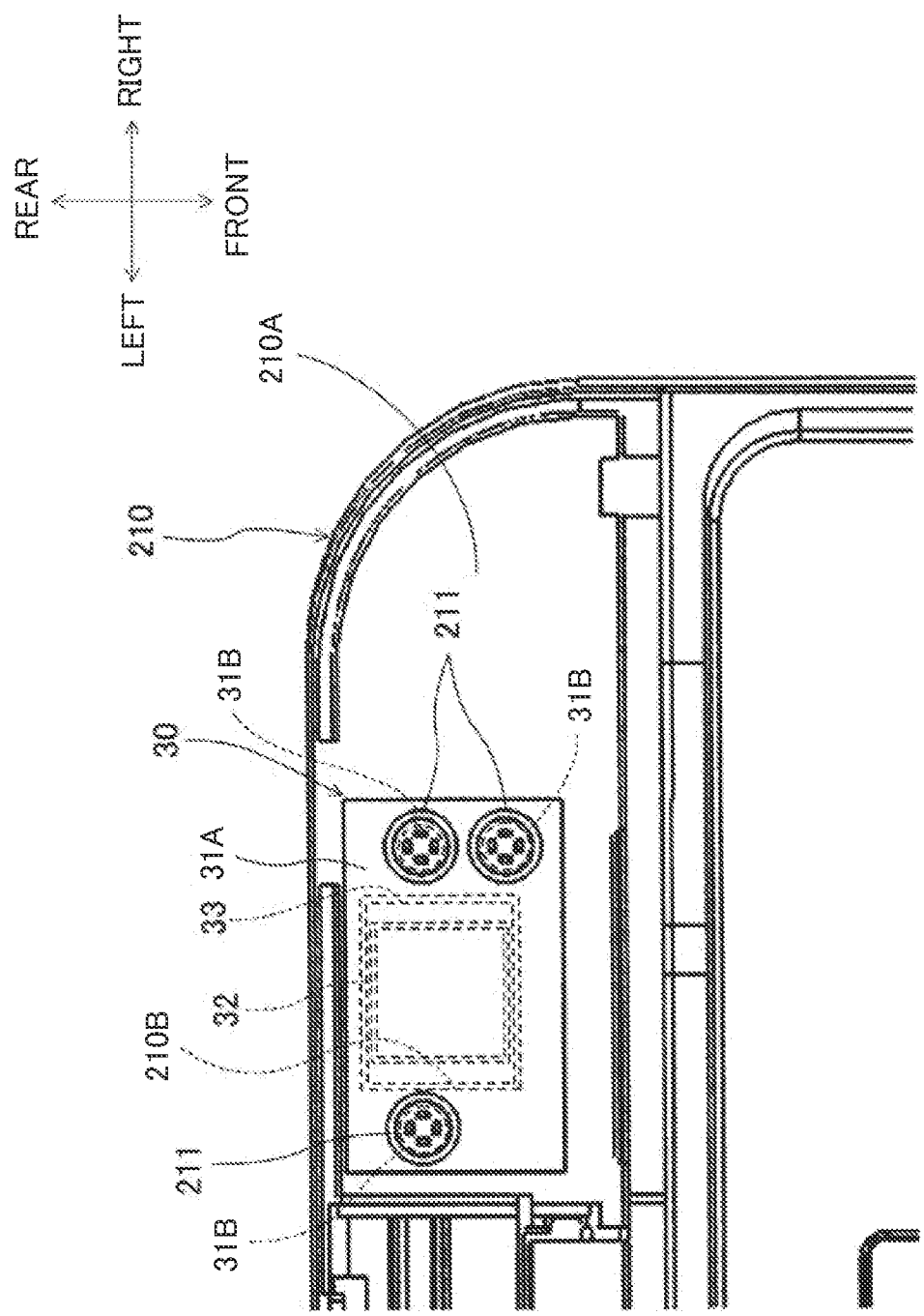
FIG. 7 is an enlarged plan view showing a portion of a base member of the document conveyance device connected with the hinge mechanism when viewed from above.

As shown in FIG. 7, a pair of right and left mounting surfaces 210A (only the right mounting surface 210A shown in FIG. 7) at which the pivot brackets 31A of the hinge mechanisms 30 are to be mounted are formed in the top surface of the base member 210 (a surface thereof opposite to the document holding surface). In each of the mounting surfaces 210A, a through hole 210B is formed to allow the stationary support 32 and the leg 33 of the hinge mechanism 30 to pass therethrough. Screw holes for fixing in which respective screws 211 are to be screwed are formed in portions of each mounting surface 210A located to the right and left of the through hole 210B.

Figure 8:
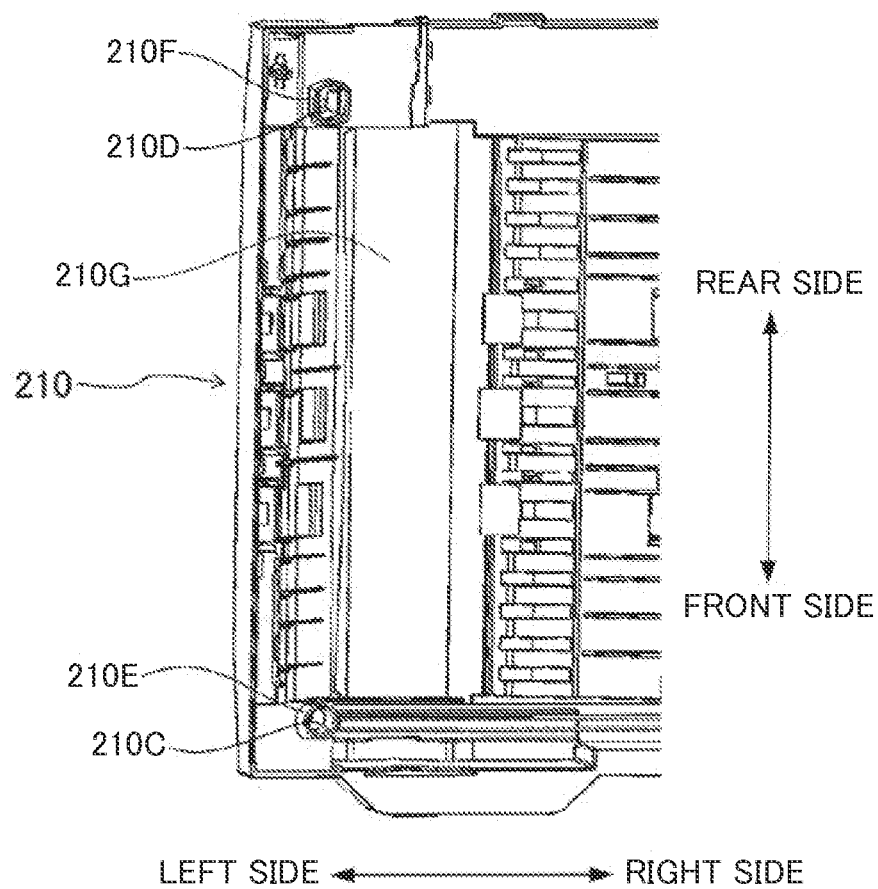
FIG. 8 is an enlarged plan view showing a left half of the base member of the document conveyance device when viewed from above.

As shown in FIG. 8, on the left half of the base member 210, a conveyance path-forming portion 210G is formed which forms a part of the document conveyance path 22 (see FIG. 2) together with the conveyance housing 220 described hereinafter. A front through hole 210C and a rear through hole 210D are formed in respective portions of the base member 210 located to the front and rear of the conveyance path-forming portion 210G of the base member 210. Both the front through hole 210C and the rear through hole 210D extend through the thickness of the base member 210. The front through hole 210C is formed in a circular shape when viewed in a direction of extension. The circumferential edge of the front though hole 210C is connected to an upstanding cylindrical guide 210E. On the other hand, the rear through hole 210D is formed as a slotted hole long in the front-to-rear direction when viewed in the direction of extension. The circumferential edge of the rear through hole 210D is connected to an upstanding tubular guide 210F. The front through hole 210C and the rear through hole 210D correspond to a pair of positioning holes formed in the base member 210.

[Details of Conveyance Housing 220 of Document Conveyance Device 200]

As shown in FIG. 5, the conveyance housing 220 forms a part of the document conveyance path 22. The conveyance housing 220 contains conveyance rollers and other components disposed along the document conveyance path 22.

Figure 9:
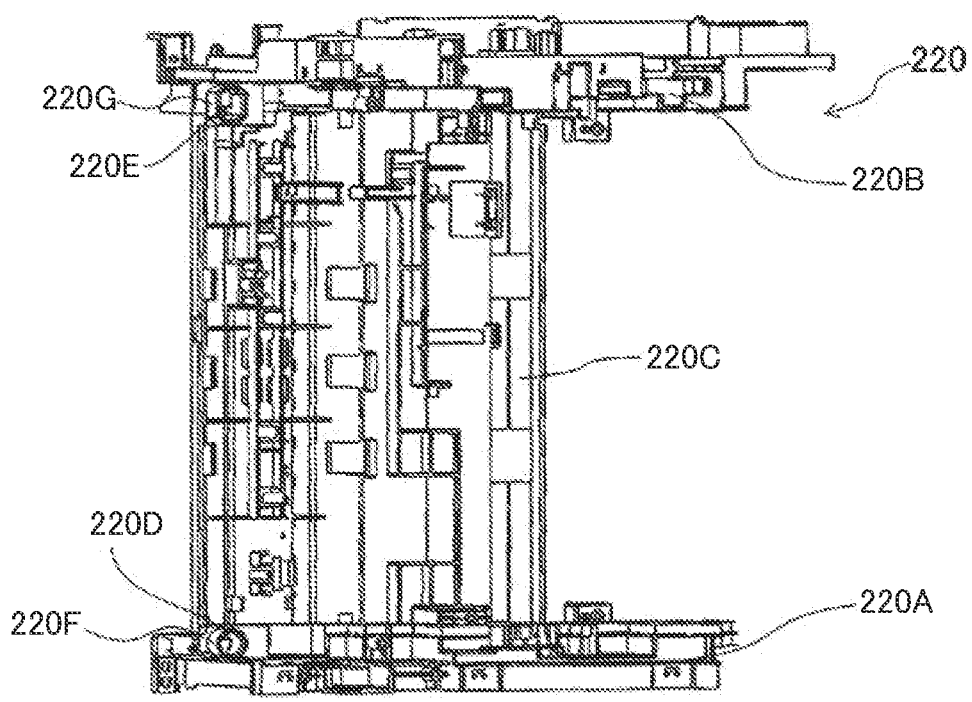
FIG. 9 is a plan view showing a conveyance housing of the document conveyance device when viewed from above.

Specifically, as shown in FIG. 9, the conveyance housing 220 includes a front side wall 220A and a rear side wall 220B to be connected to the front end and the rear end, respectively, of the base member 210, and also includes a connecting wall 220C connecting between the lower ends of both the side walls 220A and 220B. In a state where the assembly of the document conveyance device 200 is completed, the front side wall 220A and the rear side wall 220B are covered with a front cover 20A and a rear cover 20B (see FIG. 3) and are therefore not visible externally.

In the state where the assembly of the document conveyance device 200 is completed, the connecting wall 220C is covered with an openable and closable access cover 20C and is therefore not visible externally. The connecting wall 220C forms an upper part of the document conveyance path 22 together with a conveyance path-forming member 20D (see FIG. 2) supported on the inside surface of the access cover 20C. Furthermore, the connecting wall 220C forms a lower part of the document conveyance path 22 together with the conveyance path-forming portion 210G (see FIG. 8) of the base member 210.

As shown in FIG. 9, a front through hole 220D and a rear through hole 220E are formed to extend through a left end portion of the connecting wall 220C. The front through hole 220D and the rear through hole 220E are formed outward of the portion of the connecting wall 220C forming the document conveyance path 22. The front through hole 220D is formed in a circular shape when viewed in a direction of extension. The circumferential edge of the front though hole 220D is connected to an upstanding cylindrical guide 220F. The rear through hole 220E is formed as a slotted hole long in the front-to-rear direction when viewed in the direction of extension. The circumferential edge of the rear through hole 220E is connected to an upstanding tubular guide 220G. The front through hole 220D and the rear through hole 220E correspond to a pair of positioning holes formed in the conveyance housing 220.

[Details of CIS-Mounting Frame 230 of Document Conveyance Device 200]

The CIS-mounting frame 230 is a member that holds the contact image sensor 29 (see FIG. 2) and forms a part of the document conveyance path 22. As shown in FIG. 5, the CIS-mounting frame 230 can be mounted in the interior of the conveyance housing 220 from above.

Figure 10:
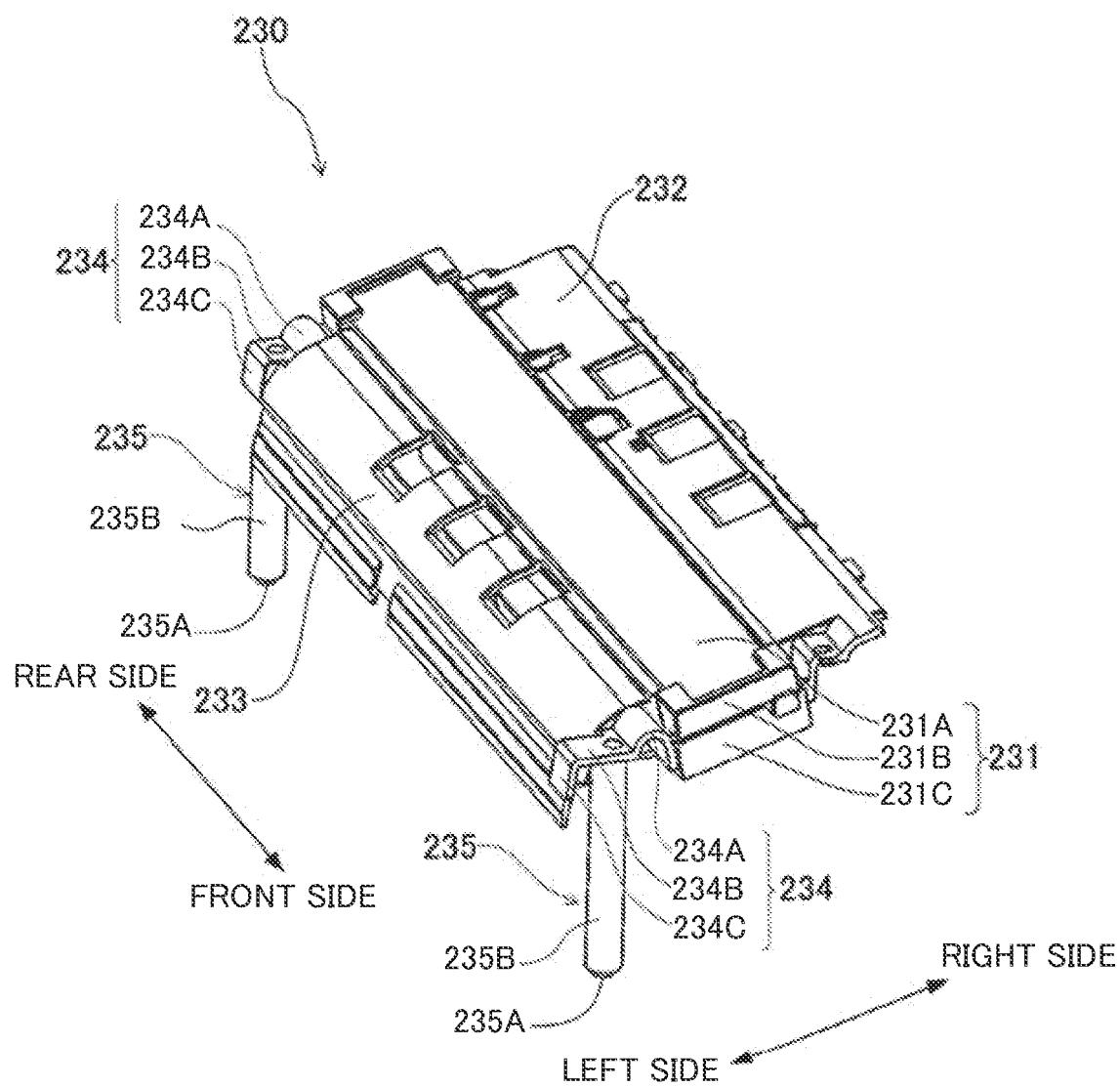
FIG. 10 is a perspective view showing a CIS-mounting frame of the document conveyance device.

Specifically, as shown in FIG. 10, the CIS-mounting frame 230 includes a CIS container 231, an upstream conveyance guide 232, a downstream conveyance guide 233, a pair of extensions 234, and a pair of positioning rods 235. The CIS-mounting frame 230 is integrally molded from, for example, a resin material.

The CIS container 231 includes: an upwardly-open, rectangular box-shaped case 231A; and a cover 231C including a transparent glass 231B. The CIS container 231 contains the contact image sensor 29. The contact image sensor 29 is composed of: a substrate on which a plurality of light-receiving elements are mounted in alignment in the front-to-rear direction; a container housing containing the substrate; and a biasing spring pressing the container housing against the transparent glass 231B.

The transparent glass 231B has a rectangular shape long in the front-to-rear direction and is fitted within the cover 231C having a rectangular frame shape. The cover 231C is removably fitted through an engagement pawl to the case 231A.

The upstream conveyance guide 232 is connected to the upstream side of the CIS container 231 in the direction of sheet conveyance. The top surface of the upstream conveyance guide 232 is formed substantially in flush with the top surface of the transparent glass 231B. The upstream conveyance guide 232 guides an original document sheet S under conveyance toward the top surface of the transparent glass 231B.

The downstream conveyance guide 233 is connected to the downstream side of the CIS container 231 in the direction of sheet conveyance. The top surface of the downstream conveyance guide 233 is formed substantially in flush with the top surface of the contact image sensor 29. The downstream conveyance guide 233 guides the original document sheet S having passed across the transparent glass 231B downstream in the direction of sheet conveyance.

The pair of extensions 234 extend downstream from a downstream side surface of the CIS container 231 in the direction of sheet conveyance. The pair of extensions 234 are located to both the front and rear, respectively, of the downstream conveyance guide 233. Each extension 234 includes an arched plate 234A located at a root end thereof, an inclined plate 234B connected to a distal end of the arched plate 234A, and a distal end plate 234C bending downward from a distal end of the inclined plate 234B.

The pair of positioning rods 235 are located to both the front and rear, respectively, of the downstream conveyance guide 233. The positioning rods 235 extend downward from the respective under surfaces of the inclined plates 234B of the pair of extensions 234. The positioning rods 235 penetrate through the conveyance housing 220 and the base member 210 like skewers to restrain the relative position among the CIS-mounting frame 230, the conveyance housing 220, and the base member 210. Each of the positioning rods 235 includes a positioning projection 235A (an example of the engaging portion) for use in defining the relative position between the document conveyance device 200 and the scanner housing 17 when the document conveyance device 200 is moved into a closed position.

Figure 11:
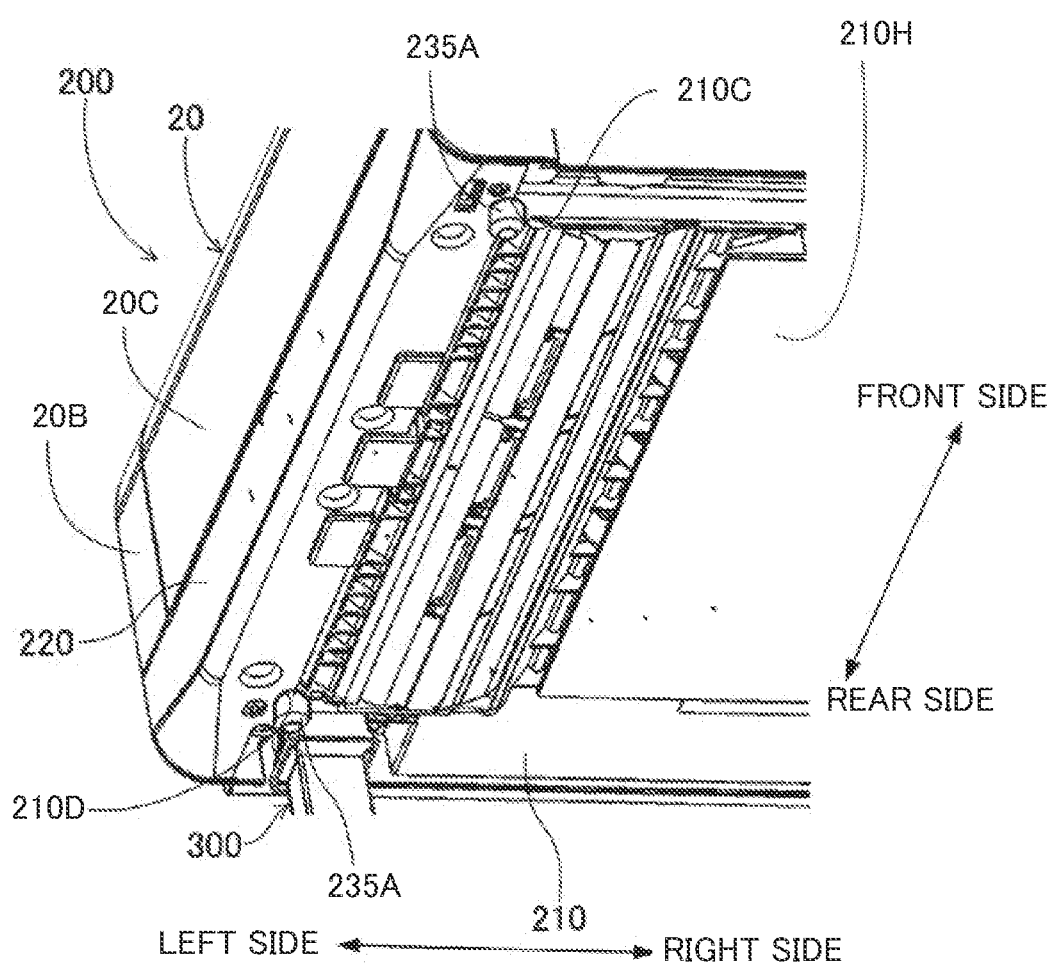
FIG. 11 is a perspective view of the document conveyance device when viewed from below.

The positioning projection 235A is provided to project from a lower end surface of a rod body 235B of the positioning rod 235. The positioning projection 235A is a columnar portion having a smaller diameter than the rod body 235B and is formed coaxially with the rod body 235B. As shown in FIG. 11, in a state where the assembly of the document conveyance device 200 is completed, the positioning projections 235A pass through the front through hole 210C and rear through hole 210D of the base member 210 and jut out downward beyond the under surface of the base member 210. When these jutting positioning projections 235A engage in the respective engagement recesses 17D and 17E (see FIG. 4) of the scanner housing 17, the document conveyance device 200 is positioned in a plane (a horizontal plane in this embodiment) along the top surface of the scanner housing 17.

[Assembly Work of Document Conveyance Device 200 and Mounting Work Thereof to Scanner Housing 17]

In assembling the document conveyance device 200 having the above structure, first, the CIS-mounting frame 230 is mounted to the conveyance housing 220 (see FIG. 5) from above. In doing so, the pair of positioning rods 235 of the CIS-mounting frame 230 are passed through the front through hole 220D and rear through hole 220E (see FIG. 9) of the conveyance housing 220. Thus, the front positioning rod 235 fits in the front through hole 220D and the rear positioning rod 235 fits within the rear through hole 220E with a play in the front-to-rear direction. In this manner, the CIS-mounting frame 230 is positioned relative to and mounted to the conveyance housing 220. As a result, a first assembly A1 (see FIG. 5) composed of the CIS-mounting frame 230 and the conveyance housing 220 is completed. In a state where the first assembly A1 is completed, the pair of positioning rods 235 jut out downward beyond the under surface of the conveyance housing 220 of the first assembly A1.

Next, the first assembly A1 is mounted to the base member 210 from above. In doing so, the pair of positioning rods 235 of the CIS-mounting frame 230 are passed through the front through hole 210C and rear through hole 210D (see FIG. 8) of the base member 210. Thus, the front positioning rod 235 fits in the front through hole 210C and the rear positioning rod 235 fits within the rear through hole 210D with a play in the front-to-rear direction. In this manner, the first assembly A1 is positioned relative to and mounted to the base member 210. As a result, a second assembly A2 composed of the base member 210 and the first assembly A1 is completed. In a state where the second assembly A2 is completed, as shown in FIG. 11, the positioning projections 235A of the pair of positioning rods 235 jut out beyond the under surface of the base member 210.

Next, the pair of hinge mechanisms 30 are mounted to the base member 210 being a constituent of the second assembly A2. In this relation, in mounting the hinge mechanisms 30, as shown in FIG. 7, the stationary support 32 and the leg 33 of each hinge mechanism 30 are inserted from above into one or the other of the respective through holes 210B formed in the two mounting surfaces 210A of the base member 210 and the inserted leg 33 is fitted into the associated leg insert hole 17C (see FIG. 4) of the scanner housing 17. In this state, the pivot brackets 31A (see FIG. 7) of the hinge mechanisms 30 are abutted against the mounting surfaces 210A of the base member 210. Next, the pivot brackets 31A are temporarily fixed to the mounting surfaces 210A by screws 211.

In this temporary fixing, the screws 211 are not fully tightened, but are kept loosened to some extent. Thus, the second assembly A2 (the assembly with the covers 20A to 20C are not yet attached to the document conveyance device 200) becomes movable in the front-to-rear and right-to-left directions in ranges of plays of the shanks of the screws 211 within the mounting holes 31B (see FIG. 7) relative to the pivot brackets 31A of the hinge mechanisms 30.

After the temporary fixing of the pivot brackets 31A to the second assembly A2 is completed, the legs 33 of the hinge mechanisms 30 are fitted into the leg insert holes 17C of the scanner housing 17. In this state, the second assembly A2 is pivotally moved about the hinge shafts of the hinge mechanisms 30 to a closed position (a position where the document holding surface 210H of the base member 210 abuts on the original glass plate 18). At this time, the pair of positioning projections 235A (see FIG. 11) jutting out beyond the under surface of the base member 210 engage in the front engagement recess 17D and the rear engagement recess 17E (see FIG. 4), respectively, of the scanner housing 17. Thus, the second assembly A2 is positioned in the front-to-rear and right-to-left directions relative to the scanner housing 17. When in this state the screws 211 (see FIG. 7) are fully tightened, the pivot brackets 31A of the hinge mechanism 30 are immovably fixed (finally fixed) to the base member 210 of the second assembly A2.

After the final fixing of the pivot brackets 31A to the base member 210 is completed, the front cover 20A, the rear cover 20B, and the access cover 20C can be attached to the exterior of the conveyance housing 200. Thus, the assembly work of the document conveyance device 200 and the mounting work thereof to the scanner housing 17 are completed.

[Effects]

As thus far described, the image reading device 300 includes the scanner housing 17, the pair of hinge mechanisms 30, and the document conveyance device 200. The document conveyance device 200 is supported pivotally about the horizontally extending axis B by the pair of hinge mechanisms 30. The document conveyance device 200 is designed to cover the top surface of the scanner housing 17 to make the top surface of the scanner housing 17 openable and closable and convey the original document sheet S to the image reading position R on the top surface of the original glass plate 18 when in the closed position. The scanner housing 17 includes the front engagement recess 17D and the rear engagement recess 17E provided in a portion of the top surface of the scanner housing 17 located outside of the original glass plate 18. The document conveyance device 200 includes the pair of positioning projections 235A (see FIG. 11) engageable in the front engagement recess 17D and the rear engagement recess 17E, respectively, when in the closed position. By the engagement of the pair of positioning projections 235A in the front engagement recess 17D and the rear engagement recess 17E, the document conveyance device 200 is positioned in a plane (a horizontal plane in this embodiment) along the top surface of the original glass plate 18. The document conveyance device 200 is fixed to the pair of hinge mechanisms 30 to allow the document conveyance device 200 to be adjusted in position in the plane.

The general image reading device described previously has a problem that the structure of the positioning mechanism is complicated, which increases the number of components and therefore increases the product cost.

Unlike the above, in this embodiment, when in mounting the document conveyance device 200 to the scanner housing 17 the document conveyance device 200 is moved to the closed position, the pair of positioning projections 235A of the document conveyance device 200 engage in the engagement recesses 17D, 17E of the scanner housing 17, so that the document conveyance device 200 is positioned. Therefore, it can be prevented that the direction of sheet conveyance of the document conveyance device 200 is skewed relative to the predetermined direction (the sub-scanning direction orthogonal to a main scanning direction). As a result, it can be prevented that troubles occur, such a skew of the document image read by the image reading device 300 relative to the background image. Furthermore, the document conveyance device 200 can be accurately positioned relative to the scanner housing 17 by an inexpensive structure.

Since the document conveyance device 200 is fixed to the pair of hinge mechanisms 30 to allow the document conveyance device 200 to be adjusted in position, the hinge mechanisms 30 can be fixed to the document conveyance device 200 after the positioning of the document conveyance device 200 is completed. Therefore, it can be prevented that in engaging the pair of positioning projections 235A of the document conveyance device 200 in the respective engagement recesses 17D, 17E of the scanner housing 17, the hinge mechanisms 30 can be prevented from being broken by an unbearable load acting on them.

In the above embodiment, the document conveyance device 200 includes: the base member 210 (see FIG. 5) covering the top surface of the scanner housing 17 when in the closed position; the conveyance housing 220 mounted to the top surface of the base member 210 and containing components for conveying original documents; the contact image sensor 29 that reads an image on the reverse side of an original document sheet S being conveyed along the document conveyance path 22; and the CIS-mounting frame 230 which is mounted in the interior of the conveyance housing 220 from above and to which the contact image sensor 29 is mounted. The CIS-mounting frame 230 includes the pair of vertically extending positioning rods 235. The pair of positioning rods 235 pass through the pair of through holes 220D, 220E provided in the conveyance housing 220 and the pair of through holes 210C, 210D provided in the base member 210 (see FIG. 10). The pair of positioning projections 235A are formed at the respective lower ends of the positioning rods 235, and jut out downward beyond the under surface of the base member 210 when the document conveyance device 200 is in the closed position.

In the above structure, when the pair of positioning rods 235 formed on the CIS-mounting frame 230 pass through the through holes 220D, 220E of the conveyance housing 220 and the through holes 210C, 210D of the base member 210, these three members (the base member 210, the conveyance housing 220, and the CIS-mounting frame 230) are defined in a predetermined proper relative position. Furthermore, when the positioning projections 235A at the lower ends of the pair of positioning rods 235 engage in the respective engagement recesses 17D, 17E of the scanner housing 17, the relative position of the three members (the document conveyance device 200) to the scanner housing 17 is defined in a proper relative position. Therefore, the direction of arrangement of light-receiving elements of the contact image sensor 29 loaded in the document conveyance device 200 and the direction of arrangement of light-receiving elements of the reading unit 19 can be defined in their proper direction (the direction orthogonal to the direction of sheet conveyance). Hence, it can be prevented that misregistration occurs between an image (an image on the reverse side of an original document sheet S) read by the contact image sensor 29 provided in the document conveyance device 200 and an image (an image on the obverse side of the original document sheet S) read by the reading unit 19 contained in the scanner housing 17.

In the above embodiment, the pivot brackets 31A of the hinge mechanisms 30 are designed to be securable to the base member 210 of the document conveyance device 200 from the side of the base member 210 opposite to the document holding surface (i.e., from above) (see FIG. 7).

In the above structure, the work for fixing the hinge mechanisms 30 can be done without breaking the relative position between the scanner housing 17 and the document conveyance device 200 once established by the engagement of the positioning projections 235A of the document conveyance device 200 in the recesses 17D, 17E of the scanner housing 17 in mounting the document conveyance device 200 to the scanner housing 17.

INDUSTRIAL APPLICABILITY

As seen from the above, the present disclosure is useful for an image reading device and an image forming apparatus equipped with the image reading device.

While the present disclosure has been described in detail with reference to the embodiments thereof, it would be apparent to those skilled in the art the various changes and modifications may be made therein within the scope defined by the appended claims.

What is claimed is:
1. An image reading device comprising:
a scanner housing that includes an original glass plate mounted in a top surface thereof and contains an optically reading device capable of optically reading an image on an original document;
a pair of hinge mechanisms provided at an end of the scanner housing; and
a document conveyance device that is supported pivotally about an axis extending in a horizontal direction by the pair of hinge mechanisms, covers the top surface of the scanner housing to make the top surface of the scanner housing openable and closable, and conveys the original document to an image reading position on a top surface of the original glass plate when in a closed position, wherein
the scanner housing includes an engaged portion for positioning provided at a portion of the top surface of the scanner housing located outside of the original glass plate,
the document conveyance device includes an engaging portion for positioning engageable with the engaged portion when in the closed position, and is positioned in a plane along the top surface of the original glass plate by engagement of the engaging portion with the engaged portion, and
in positioning the document conveyance device, the document conveyance device is fixed to the pair of hinge mechanisms to allow the document conveyance device to be adjusted in position in the plane.
2. The image reading device according to claim 1, wherein
the optically reading device is designed to read an image on an obverse side of an original document being conveyed to the image reading position by the document conveyance device,
the document conveyance device comprises: a base member covering the top surface of the scanner housing when in the closed position; a conveyance housing mounted to a top surface of the base member and containing components for use in conveying the original document; a contact image sensor that reads an image on a reverse side of the original document being conveyed along a document conveyance path; and a CIS-mounting frame which is mounted in an interior of the conveyance housing from above the conveyance housing and to which the contact image sensor is mounted,
the CIS-mounting frame comprises a pair of positioning rods that vertically extend and pass through a pair of positioning holes provided in the conveyance housing and a pair of positioning holes provided in the base member,
the pair of positioning rods comprise, as the engaging portion for positioning, respective positioning projections jutting out downward beyond an under surface of the base member when the document conveyance device is in the closed position, and
the engaged portion comprises engagement recesses that engage with the respective positioning projections when the document conveyance device is moved to the closed position.
3. The image reading device according to claim 2, wherein
the base member has a document holding surface that covers the top surface of the scanner housing when the document conveyance device is in the closed position, the hinge mechanisms each comprise: a pivoting portion secured by a screw to the document conveyance device; a stationary support supporting the pivoting portion pivotally about the axis; and a leg extending downward from a bottom surface of the stationary support, and the pivoting portion is designed to be securable to the base member of the document conveyance device from a side of the base member opposite to the document holding surface.

4. The image reading device according to claim 1, wherein at least one of the engagement recesses is a bottomed, slotted recess extending in a predetermined direction.

5. An image forming apparatus comprising:

the image reading device according to claim 1; and an image forming device that forms, on a recording medium, the image on the original document read by the image reading device.

* * * * *